(12) United States Patent
Viel et al.

(10) Patent No.: US 8,537,492 B2
(45) Date of Patent: Sep. 17, 2013

(54) SECURING APPARATUS

(75) Inventors: Dominique Viel, Shipley (GB); Jerome Barreau, Shipley (GB); Jean Louis Finot, Shipley (GB)

(73) Assignee: Pace Plc, Shipley (GB)

( * ) Notice: Subject to any disclaimer, the term of this patent is extended or adjusted under 35 U.S.C. 154(b) by 268 days.

(21) Appl. No.: 13/222,852

(22) Filed: Aug. 31, 2011

(65) Prior Publication Data

US 2012/0051720 A1 Mar. 1, 2012

(30) Foreign Application Priority Data

Sep. 1, 2010 (GB) .................................. 1014487.1

(51) Int. Cl.
*G11B 15/68* (2006.01)
(52) U.S. Cl.
USPC ........................................................ 360/92.1

(58) Field of Classification Search
USPC ........................................................ 360/92.1
See application file for complete search history.

(56) References Cited

U.S. PATENT DOCUMENTS

2005/0277308 A1* 12/2005 Kirby et al. ..................... 439/64

* cited by examiner

*Primary Examiner* — Mark Blouin
(74) *Attorney, Agent, or Firm* — Head, Johnson & Kachigian, P.C.

(57) ABSTRACT

The invention relates to apparatus such as a broadcast data receiver which can selectively receive a data storage item therewith to allow the passage of data therebetween and/or storage of data thereon. The invention provides the apparatus with a recess into which the storage item can be placed and connected and a securing member which can be moved into position to secure and retain the data storage item in location with the apparatus.

20 Claims, 7 Drawing Sheets

SECURING APPARATUS

BACKGROUND OF THE INVENTION

1. Field of the Invention

The invention to which this application relates is a securing apparatus for a hard disc drive.

Although the following description refers almost exclusively to use of securing apparatus for a hard disc drive in a broadcast data receiver, it will be appreciated by persons skilled in the art that the present invention can be used to secure other devices in relation to different types of equipment.

2. Prior Art

Broadcast data receivers (BDRs) typically comprise a tuner and a decoder for receiving satellite transmissions of television program data, and outputting the data for viewing on a television set or other display device. BDRs are sometimes referred to as Set Top Boxes (STBs) accordingly.

More recently, BDRs have been provided with internal hard drives which allows the programs to be recorded thereon, such that the same can be reproduced from storage for viewing at a later date.

However, if the user wishes to record a large number of programs, the hard disc drive can run out of space, such that later programs cannot be stored.

The user can replace the hard disc drive with a larger model, but this is a relatively technical task as it involves unscrewing the housing of the BDR, removing the screws securing the existing hard drive inside the BDR, lifting out the old hard drive, inserting the new hard drive, securing the new hard drive in place with screws, then replacing the housing.

It is possible to provide a system in which the hard drive is a precision fit for the housing, so that screws are not required to lock the hard drive into place, and therefore replacing the hard drive is much easier.

However, while there is a standard width for '3.5 inch' form factor hard drives (the actual external diameter is about 102 mm i.e. 4 inches), the depth can vary from around 19 to 26 mm. The length of such a drive is typically around 146 mm but this can also vary.

Therefore if the replacement drive is a different depth it would either not fit or not be securely held in place by the aforementioned screwless system. As hard drives are fragile devices, it may be easily damaged if not securely held inside the housing of the BDR.

An aim of the present invention is to provide securing apparatus for securing a hard drive inside electronic equipment.

In an aspect of the invention, there is provided securing apparatus comprising:
receiving means with walls defining a recess for receiving an item therein;
guide means located along at least a part of at least one wall of the receiving means; and
at least one securing member associated with said guide means;
characterised in that the securing member is selectively moveable relative to the guide means to secure the item in the recess.

In one embodiment the receiving means is formed as part of a broadcast data receiver (BDR). Typically the BDR is provided with a housing, a portion of which may be removed to reveal the recess.

Typically the other components of the BDR, such as the printed circuit boards associated with receiving and/or decoding signals, are not exposed when the portion of the housing is removed.

In one embodiment, the item is a hard disc drive. Typically the receiving means is provided with connection means for the hard disc drive. Typically the connection means includes any or any combination of IDE, SATA, SCSI, power, and/or other connectors.

Typically the hard disc drive is connected to the BDR to allow data such a television programs to be stored thereon for later playback.

Typically the recess has a diameter of around 102 mm or just over so that a standard hard disc drive fits snugly therein. Typically the recess has a length ranging from around 150 mm to 200 mm, and a depth of around 30 mm.

In one embodiment the receiving means includes a ramp section. Typically the ramp section is located at the opposite end of the receiving means to the hard disc drive connection means.

Thus the ramp allows the hard disc to be placed into the recess, and slid into connection with the connection means. The provision of the ramp means that the hard disc drive is not simply dropped into the recess, which could damage the fragile drive, and that the drive is connected with the BDR at the correct angle with a simple sliding motion, which helps avoid damaging the connection means.

In one embodiment the guide means comprise one or more slots. Typically a portion of each of two opposed side walls are provided with a slot extending therealong.

In one embodiment the lower edge of the slot is provided with a rail or shoulder. Typically at least a part of the slot slopes such that the height of the edge with respect to the recess varies.

In one embodiment the securing member is slideably mounted on the guide means via the shoulder or rail.

Typically the securing member is an elongate locking bar, extending between the two slots on either side of the recess.

In one embodiment the securing member is provided with protrusions for holding the securing member to the slot. Typically the protrusions are snap-on tabs which locate on the underside of the flanges.

In one embodiment the upper edge of the slot is provided with teeth for engaging protrusions provided on the securing member.

In a further embodiment the upper surface of the securing member is provided with recesses or longitudinal grooves for engaging the teeth and/or providing the user with increased grip for moving the securing member.

In one embodiment the lower surface of the securing member is substantially flat. Thus the lower surface can slide along the surface of a hard disc drive without being snagged.

In one embodiment the securing member is provided with biasing means to bias the securing member into engagement with the teeth.

In one embodiment the lower edge of the slot is provided with one or more bumps for removably retaining the securing member in a particular position. Typically the spring member abuts against the bumps.

In a further aspect of the invention there is provided a broadcast data receiving apparatus comprising:
means with walls defining a recess for receiving a data storage item therein;
and
at least one securing member associated with said recess and characterised in that the securing member is selectively moveable relative to the recess to a position to secure and retain the item in the recess and in connection with the broadcast data receiving apparatus to allow the passage of data therebetween in the recess.

In a further aspect of the invention, there is provided a broadcast data receiver comprising:

a housing, a portion of which is removable to reveal a recess for receiving and electrically connecting a hard disc drive;

said recess being defined by walls, guide means being located along at least a part of at least one wall; and at least one securing member associated with said guide means;

characterised in that the securing member is selectively moveable relative to the guide means to secure the hard disc drive in the recess.

In a yet further aspect of the invention, there is provided a method of securing a hard disc drive inside a broadcast data receiver comprising the steps of:

inserting a hard disc drive into a recess defined by walls within the broadcast data receiver;

securing the hard disc drive in the recess using a securing member;

characterised in that the securing member is selectively moved relative to guide means located along at least a part of at least one wall to secure the hard disc drive.

In one embodiment one end of the hard disc drive is placed on a ramp inside the recess.

In one embodiment the hard disc drive is slid into electrical connection with the broadcast data receiver.

In one embodiment the securing member is slidingly moved along the guide means until it abuts against the hard disc drive.

In one embodiment part of the movement of the securing member is inclined at an angle to the recess and/or upper surface of the hard drive.

In one embodiment teeth on the upper edge of the slot engage protrusions provided on the securing member.

In one embodiment the securing member is biased into engagement with the teeth.

DETAILED DESCRIPTION OF THE PREFERRED EMBODIMENTS

Figure 1:
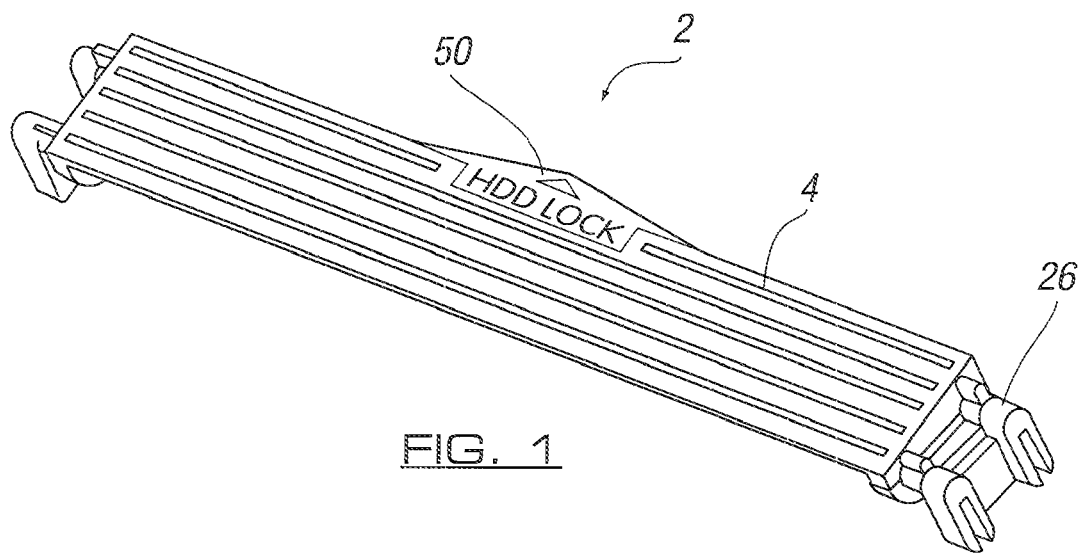
FIG. 1 illustrates a securing member in accordance with an embodiment of the invention.

With reference to FIG. 1, there is illustrated a securing member in the form of an elongate locking bar 2 with longitudinal grooves 4 on the upper surface. The locking bar is substantially flat on the underside (not shown). The arrow 50 on the locking bar indicates the intended direction of movement to lock a hard drive in position.

Figure 2:
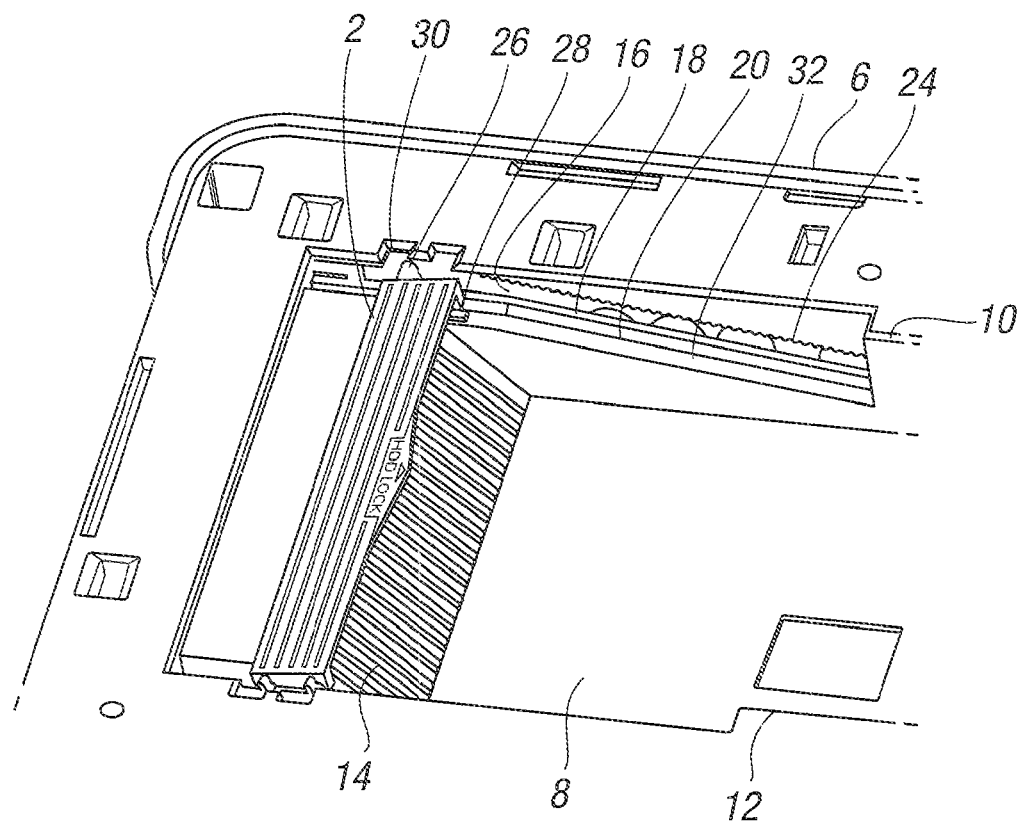
FIG. 2 illustrates securing apparatus in accordance with an embodiment of the invention.

With reference to FIG. 2, the locking bar 2 is fitted to a broadcast data receiver 6, of which a portion of the housing has been removed to reveal receiving means for a hard drive. The receiving means includes two longitudinal side walls 10, 12 which define a cavity or recess 8 having a slightly largely diameter than that of a standard hard disc drive (not shown).

A connector (not shown) for the hard disc drive is provided at one end of the recess. At the other end of the recess a ramp section 14 is provided so that the hard drive can be gently slid into electrical connection with the BDR via the connector.

In each of the side walls 10, 12 a slot 16 is provided, a section of which is angled. The lower edge 32 of the slot includes a rail or shoulder 18 which is raised from the lower edge by a small vertical wall 20.

Figure 3:
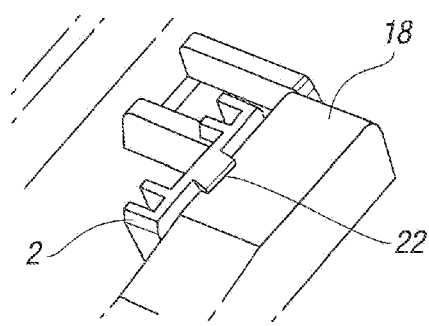
FIG. 3 illustrates how the securing member is fitted to the receiving means in accordance with an embodiment of the invention

The ends of the locking bar 2 are slideably mounted on the shoulders 18, and as can be seen in FIG. 3, are provided with snap-on tabs which locate on the underside of the shoulder 18 for holding the locking bar 2 in the slot 16.

The upper edge 24 of the slot is provided with teeth for engaging protrusions 26 provided on the locking bar 2. The locking bar 2 is provided with biasing means in the form of spring member 28 to bias the protrusions 26 into engagement with the teeth of the upper edge 24.

The opening in the housing has shaped sections 30 to allow the locking bar 2 to be removed therethrough and replaced if necessary.

Figure 5:
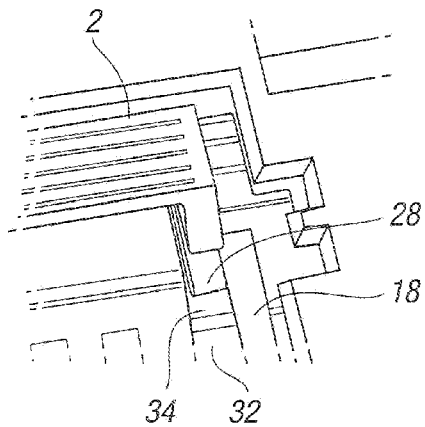
FIG. 5 illustrates how the securing member is retained in the default position.
Figure 4:
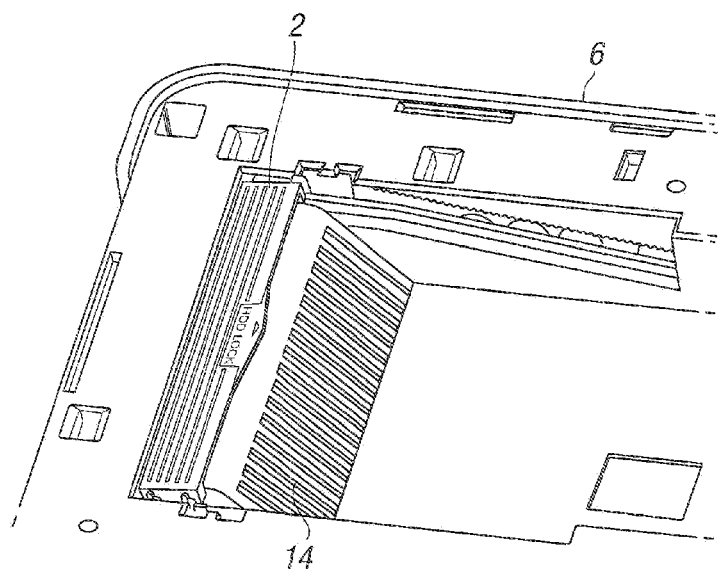
FIG. 4 illustrates the securing apparatus of FIG. 2, with the securing member in the default position.

With reference to FIGS. 4-5, the locking bar 2 has been moved to the default position at the end of the recess, beyond the ramp 14, and is retained in that position by bumps 34 on the lower edge 32 of the slot which abut against the spring member 28.

Figure 6A:
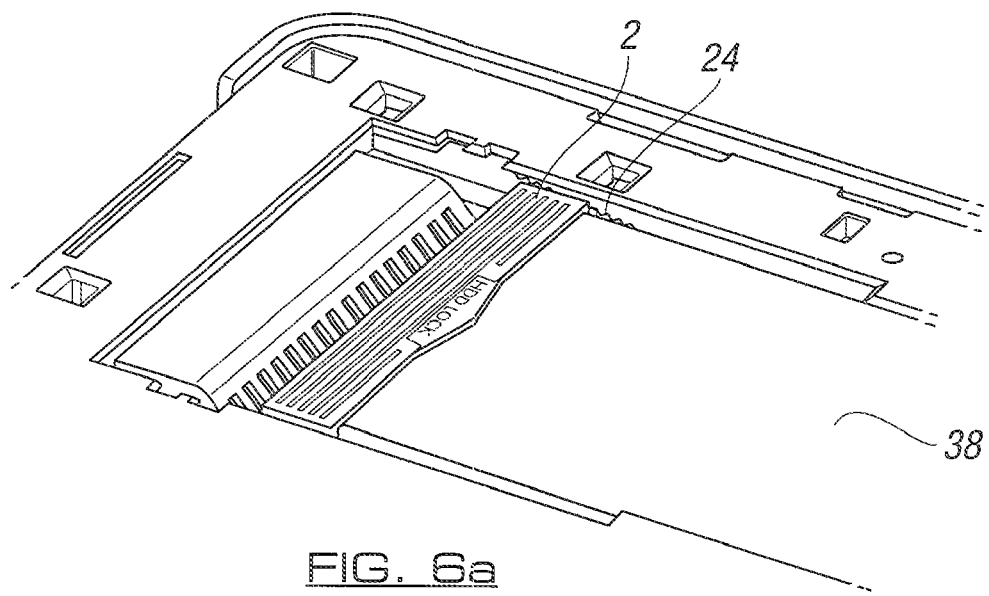
FIG. 6 illustrates securing apparatus in accordance with an embodiment of the invention securing (*a*) a thick hard disc drive; and (*b*) a thin hard disc drive.
Figure 6B:
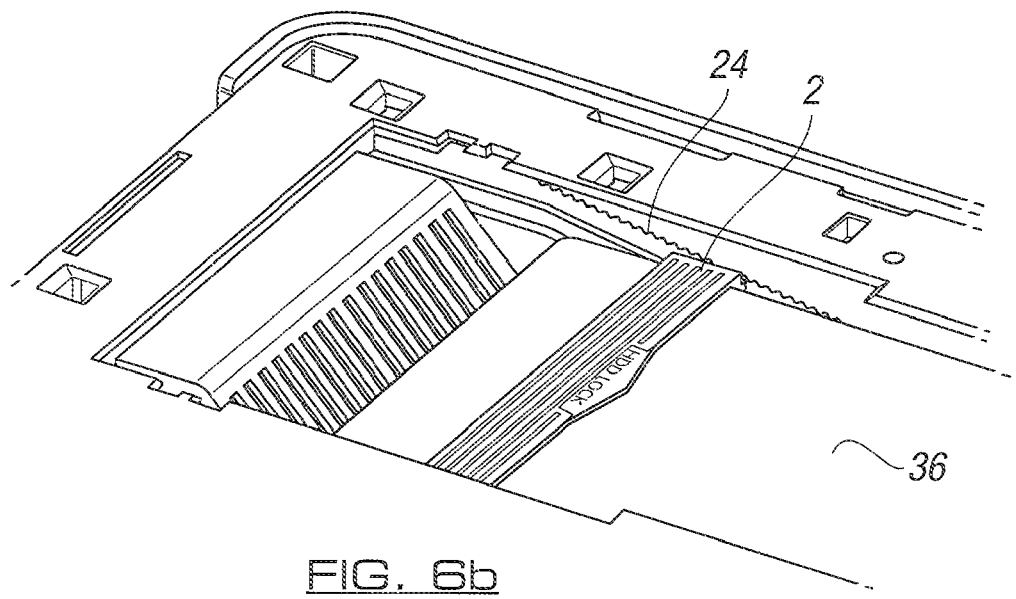

With reference to FIGS. 6*a-b*, a hard disc drive can be inserted into the recess and the locking bar can then be moved from the default position at the end of the recess, across the top of the hard drive towards the other end of the recess and downwardly in the sloping slot, until the locking bar abuts the upper surface of the hard drive, forcing the protrusions 26 of the locking bar to engage the teeth of the upper edge 24. The locking bar moves by each end riding down the lower edge 32 on the spring member 28 and shoulder 20.

As such, the locking bar is moved further across the recess to secure a thin hard disc drive 36 than a thick hard disc drive 38. The hard disc drive is thus secured in the recess by the flat underside of the locking bar which abuts against the upper surface of the hard disc drive. The end of the hard disc drive is also held in place to some extent by the BDR hard disc drive connector (not shown) which protrudes into the recess and engages the corresponding connector of the hard disc drive.

The securing apparatus can thus be used to secure hard drives with different depths, as the locking bar is selectively adjustable as necessary.

Figure 7A:
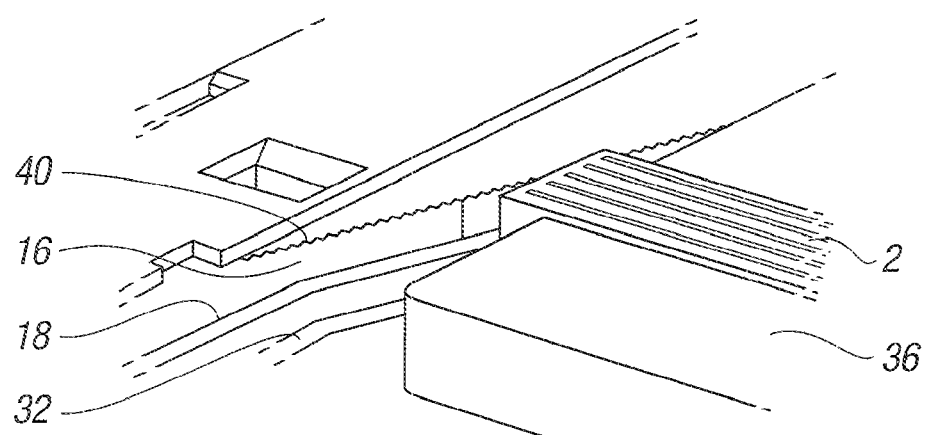
FIG. 7 illustrates further detail of the securing apparatus in accordance with an embodiment of the invention, with close-up views of: (*a*) the slot from inside the recess; (*b*) an end of the securing member; and (*c*) the slot from outside the recess.
Figure 7B:
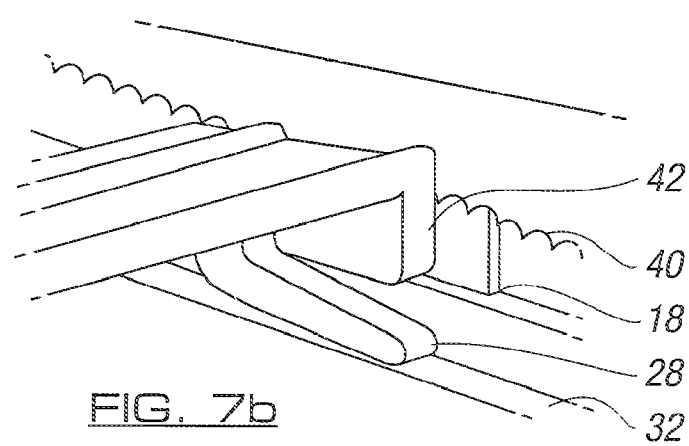
Figure 7C:
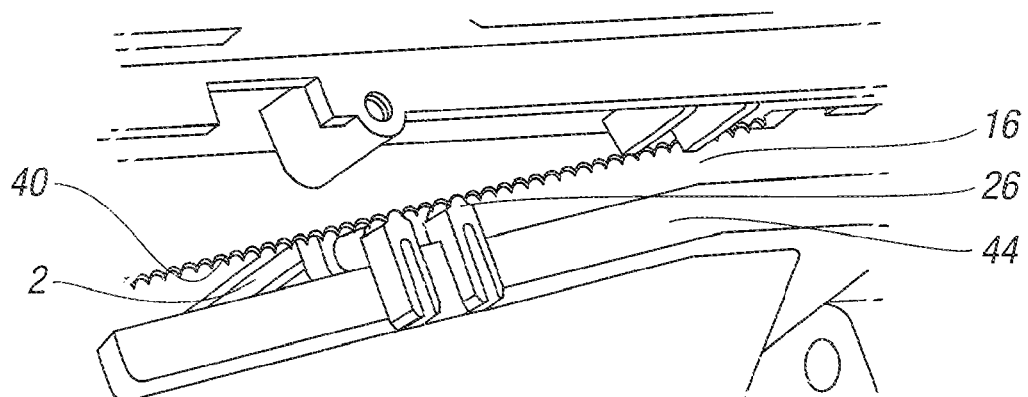

With reference to FIGS. 7a-c, further details can be seen of how the protrusions 26 of the locking bar 2 engage the teeth 40 of the upper edge of the slot 16.

The locking bar 2 is positioned such that the spring member 28 is on the opposite side of the shoulder 18 to the protrusions 26, which extend downwards on the other side of the shoulder to hold the locking bar thereto, and form a surface 42 which easily slides against the reverse surface 44 of the shoulder.

Figure 8A:
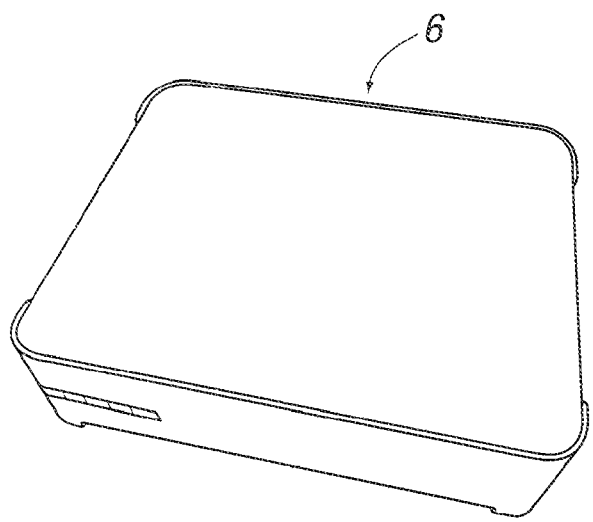
FIG. 8 illustrates a broadcast data receiver utilising securing apparatus in accordance with an embodiment of the invention (*a*) underside of housing; (*b*) with part of housing being removed.
Figure 8B:
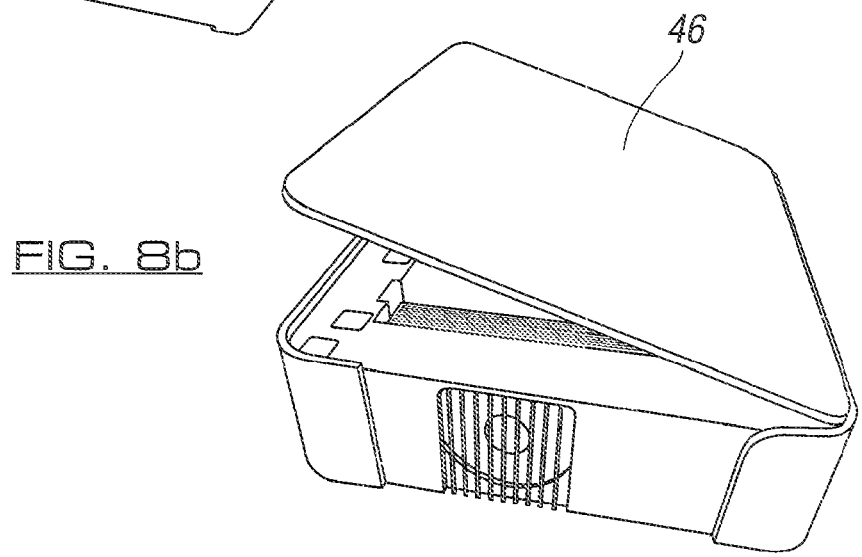

With reference to FIG. 8a-b, there is illustrated a broadcast data receiver 6, with a part of the housing 46 being removed on the underside of the BDR.

Figure 9:
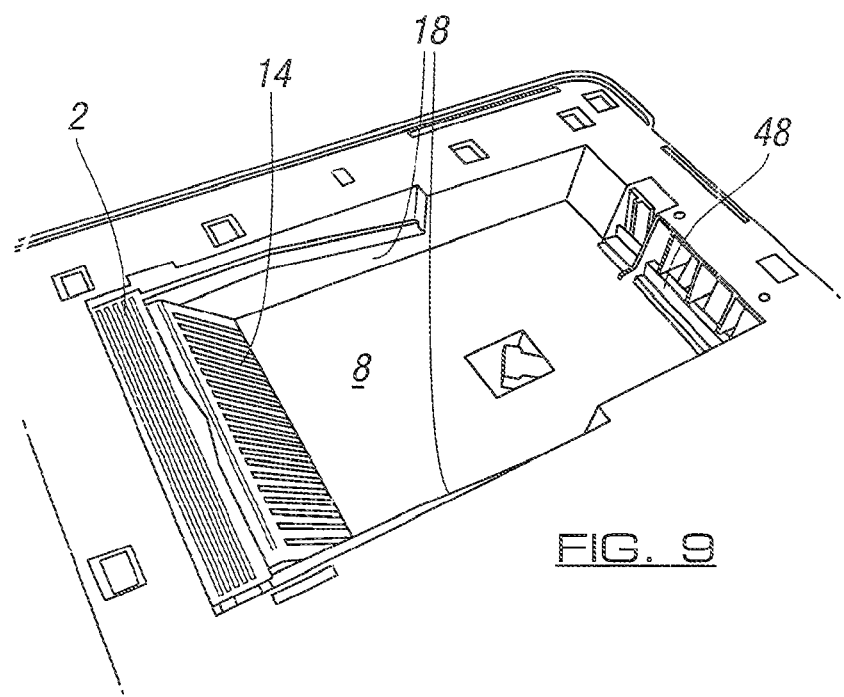
FIG. 9 illustrates a broadcast data receiver with part of the housing removed, utilising securing apparatus in accordance with an embodiment of the invention.

With reference to FIG. 9, the recess is visible after removing part of the housing, with the sliding locking bar in the default position. A hard drive may be placed in the recess 8 and slid into electrical connection with the connector 48 in the BDR. The locking bar can then be slid across the rails 18 to lock the drive in the cavity. Screws are thus not required to secure the drive in position.

Figure 10A:
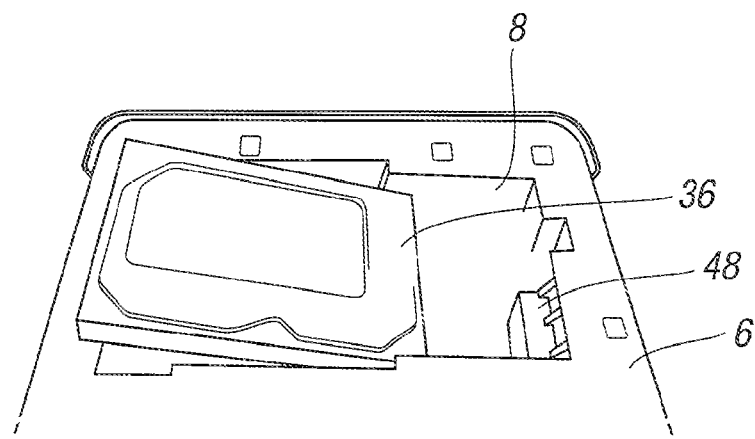
FIG. 10 illustrates a broadcast data receiver with securing apparatus in accordance with an embodiment of the invention being fitted with a thin hard drive (*a*) insertion of hard drive; (*b*) connection of hard drive; (*c*) securing of hard drive.
Figure 10B:
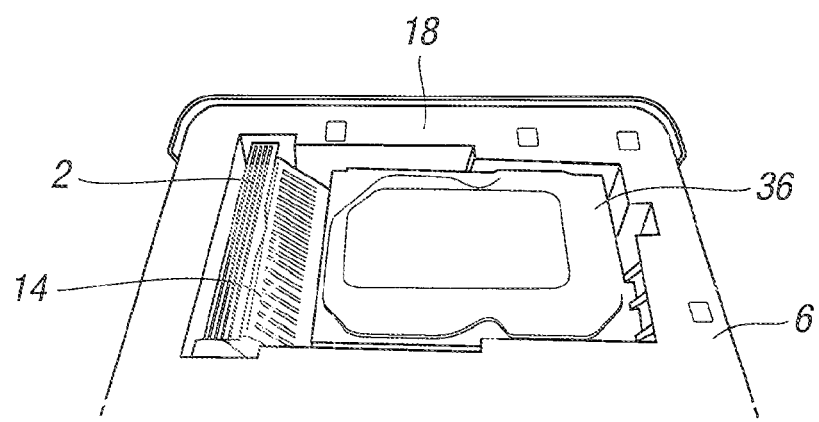
Figure 10C:
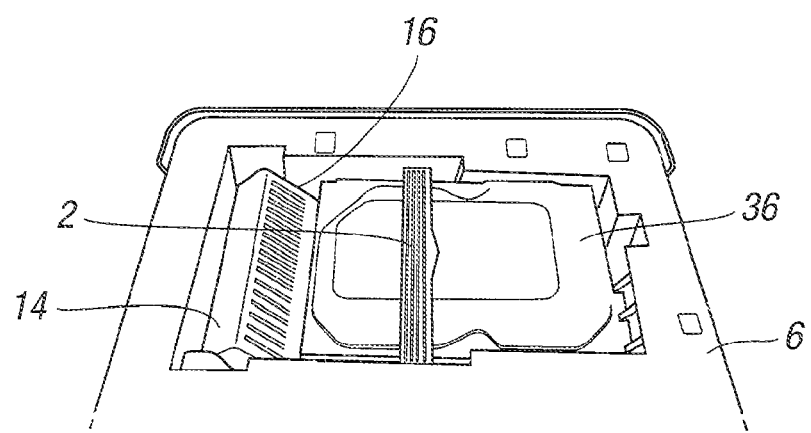

With reference to FIGS. 10a-c, a hard drive is fitted to the BDR. As the recess is not wide enough to insert a finger, the end of the drive is first gently rested on the ramp 14 at one end of the recess 8, so that it can be gently slid into electrical connection with the connector 48 of the BDR at the other end of the recess 8.

Once the drive is connected and lying flat in this manner, the locking bar can be slid across as hereinbefore described to secure the drive in position.

Figure 11A:
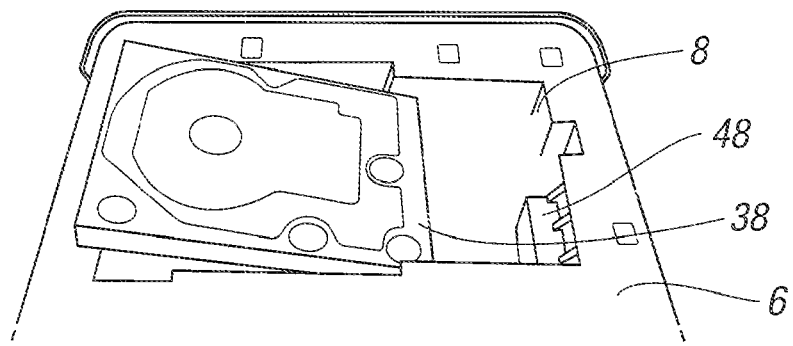
FIG. 11 illustrates a broadcast data receiver with securing apparatus in accordance with an embodiment of the invention being fitted with a thick hard drive (*a*) insertion of hard drive; (*b*) connection of hard drive; (*c*) securing of hard drive.
Figure 11B:
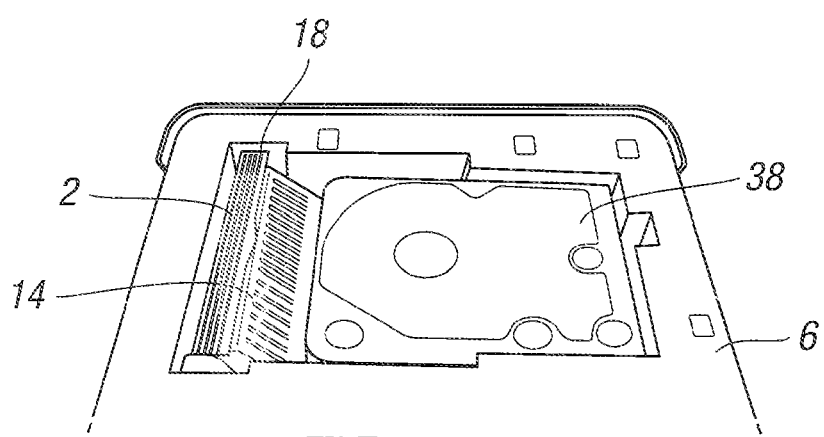
Figure 11C:
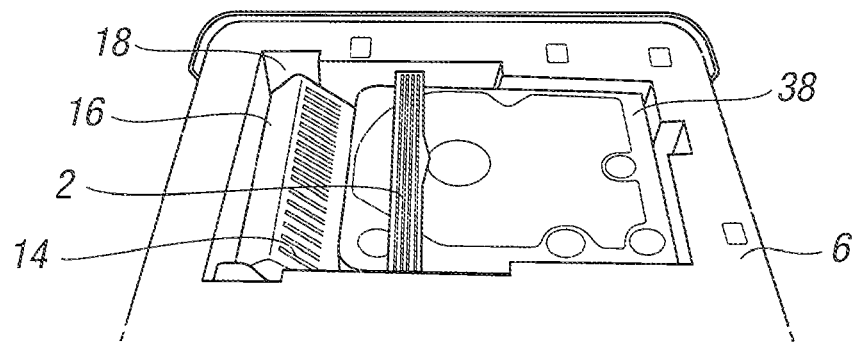

With reference to FIGS. 11a-c, a different hard drive is fitted using the same steps, and it can be seen that as the drive is deeper, the locking bar does not move across as far.

Thus a simple mechanism is provided for securing a hard drive to apparatus such as a broadcast data receiver, which advantageously requires no screws or other fastenings which may require tools to operate.

It will be appreciated by persons skilled in the art that the present invention may also include further additional modifications made to the apparatus which does not affect the overall functioning of the apparatus.

What is claimed is:

1. Securing apparatus comprising:
    receiving means with walls defining a recess for receiving an item therein;
    guide means located along at least a part of at least one wall of the receiving means; and
    at least one securing member associated with said guide means;
    characterised in that the securing member is selectively moveable relative to the guide means to secure the item in the recess.

2. Apparatus according to claim 1 wherein the receiving means is formed as part of a broadcast data receiver (BDR).

3. Apparatus according to claim 1 wherein the item is a hard disc drive.

4. Apparatus according to claim 1 wherein the receiving means is provided with connection means for the hard disc drive.

5. Apparatus according to claim 2 wherein the hard disc drive is connected to the BDR to allow data such as data for one or more television programs to be stored thereon for later playback.

6. Apparatus according to claim 1 wherein the receiving means includes a ramp section.

7. Apparatus according to claim 6 wherein the ramp section is located at the opposite end of the receiving means for connection means for a hard disc drive.

8. Apparatus according to claim 7 wherein the ramp section allows the hard disc to be placed into the recess, and slid into connection with the connection means.

9. Apparatus according to claim 1 wherein the guide means comprise one or more slots.

10. Apparatus according to claim 9 wherein a portion of each of two opposed side walls are provided with a slot extending therealong.

11. Apparatus according to claim 10 wherein the lower edge of the slot is provided with a rail or shoulder.

12. Apparatus according to claim 10 wherein at least a part of the slot slopes such that the height of the edge with respect to the recess varies.

13. Apparatus according to claim 11 wherein the securing member is slideably mounted on the guide means via the shoulder or rail.

14. Apparatus according to claim 1 wherein the securing member is an elongate locking bar, extending between guide means on either side of the recess.

15. Apparatus according to claim 14 wherein the securing member is provided with protrusions for holding the securing member to slots which act as the guide means.

16. Apparatus according to claim 1 wherein the upper edge of the slot is provided with teeth for engaging protrusions provided on the securing member and the upper surface of the securing member is provided with recesses or longitudinal grooves for engaging the teeth and/or providing the user with increased grip for moving the securing member.

17. Apparatus according to claim 1 wherein the securing member is provided with biasing means to bias the securing member into engagement with the teeth.

18. Broadcast data receiving apparatus comprising:
    means with walls defining a recess for receiving a data storage item therein; and
    at least one securing member associated with said recess and
    characterised in that the securing member is selectively moveable relative to the recess to a position to secure and retain the item in the recess and in connection with the broadcast data receiving apparatus to allow the passage of data therebetween in the recess.

19. A broadcast data receiver comprising:
    a housing, a portion of which is removable to reveal a recess for receiving and electrically connecting a hard disc drive;
    said recess being defined by walls, guide means being located along at least a part of at least one wall; and
    at least one securing member associated with said guide means;
    characterised in that the securing member is selectively moveable relative to the guide means to secure the hard disc drive in the recess.

20. A method of securing a hard disc drive inside a broadcast data receiver comprising the steps of:
    inserting a hard disc drive into a recess defined by walls within the broadcast data receiver;
    securing the hard disc drive in the recess using a securing member;
    characterised in that the securing member is selectively moved relative to guide means located along at least a part of at least one wall to secure the hard disc drive.

* * * * *